EDWARD FIELD.
Flexible Lip-Formed Valves.
No. 5,431. Reissued June 3, 1873.
Fig. 1.
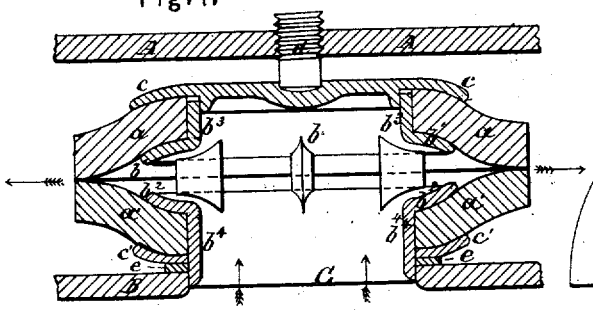
Fig. 2.
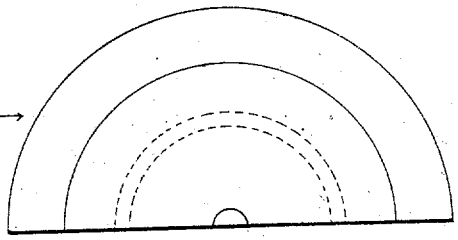
Fig. 3.
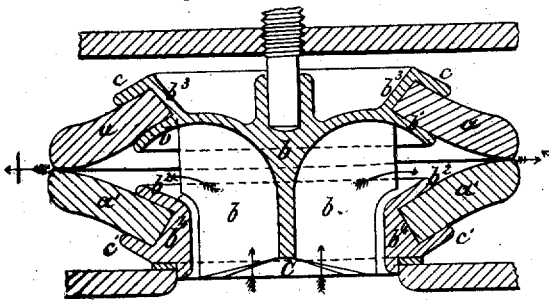
Fig. 4.
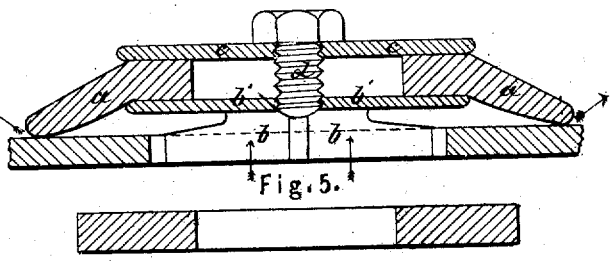
Fig. 5.
Fig. 6.
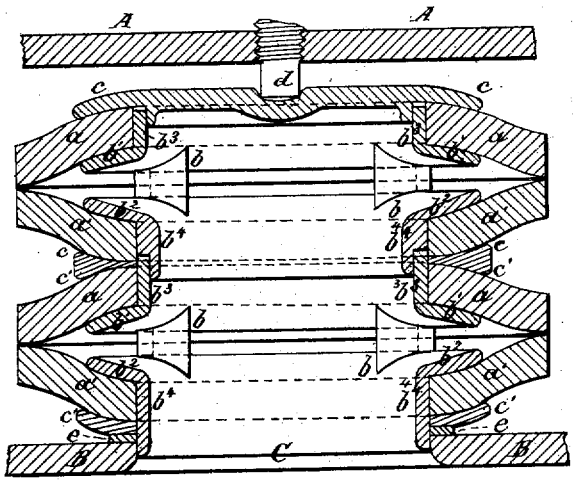
Witnesses:
W. Lloyd Wise
Francis M. Cotton
Inventor:
Edward Field
AM. PHOTO-LITHOGRAPHIC CO. N.Y. (OSBORNE'S PROCESS)

UNITED STATES PATENT OFFICE.

EDWARD FIELD, OF MIDDLESEX COUNTY, ENGLAND.

IMPROVEMENT IN FLEXIBLE LIP-FORMED VALVES.

Specification forming part of Letters Patent No. 127,038, dated May 21, 1872; reissue No. 5,431, dated June 3, 1873; application filed April 19, 1873.

*To all whom it may concern:*

Be it known that I, EDWARD FIELD, of Middlesex county, England, have invented a Flexible Lip-Formed Valve, of which the following is a specification:

This invention relates to the construction of elastic valves for pumps, &c., suitable for withstanding high pressures; and consists in making them with holding-plates or rings and corresponding seat-plates or ledges contrived to hold the elastic valves in such manner as that when at rest only their outer circumferences meet (or nearly meet) each other, or the surfaces against which the valves close.

Figure 1 is a vertical section through the center of a valve made according to this invention. Fig. 2 is a half plan of same. Fig. 3 is a vertical section of a modification of the foregoing. Fig. 4 is a similar view of a valve as arranged to close against a fixed seat. Fig. 5 is a transverse section of one of the flexible valve-lips. Fig. 6 is a view, showing a series of valves arranged in tiers to accommodate large diameter of suction or delivery in a small space.

In Fig. 1, *a* is the upper elastic valve, and *a'* the lower one. Both the valves are made quite flat, like rings or washers, with holes through their central portions, and are forced into and caused to retain the shapes represented in Fig. 1, by being compressed and held at their inner edges between their respective adjustable plates and the corresponding seats or ledges, which latter form portions of the main body or castings *b* of the apparatus, $b^1$ being the seat or ledge of the upper valve *a*, and $b^2$ the corresponding seat or ledge of the lower valve *a'*. The seats or ledges $b^1$ and $b^2$ are formed with circular abutments $b^3$ and $b^4$. *c* is the holding-plate of the upper valve *a*, and *c'* the corresponding plate of the lower valve *a'*. These two plates are shaped so that the inner surface of the curved portion of each holding-plate is parallel to the surface of the corresponding seat or ledge, and the outer edges of the elastic valves which project beyond the holding-plates and seats or ledges are caused to press against each other like lips, with a force which will be directly proportioned to the pressure against them of the fluid in the valve-chamber A B, by which they are surrounded.

In putting the parts together the elastic valves *a* and *a'* are first drawn over their abutments $b^3$ $b^4$, so that they rest against their respective seats or ledges $b^1$ $b^2$, and the holding-plates *c* *c'* placed in their proper relative positions; then the whole valve is placed in the valve-chamber A B, over the opening or passage C, (a leather or other packing-ring, *e*, being interposed to make the joint,) and the adjustable screw *d* is turned, thereby causing the upper and lower holding-plates to squeeze the elastic valves against their respective seats or ledges, and against each other, so that when a partial vacuum is created in the valve-chamber, or when the pressure of the fluid behind the valves is greater than that in the valve-chamber, fluid will be allowed to pass between the outer edges or lips of the valves in the direction indicated by the arrows, so as to enter the valve-chamber; but that, on the other hand, any excess of pressure of the fluid in the valve-chamber over that behind the valves, instead of opening them, will cause their lips to press more and more tightly against each other, so as to prevent the fluid from passing between them out of the valve-chamber.

In Fig. 3 the holding-plates *c* *c'* are cast in one piece with the main body *b*, and the two elastic flat circular valves *a* and *a'* are forced into their respective positions by being drawn or stretched over their respective holding-plates until the edges of the valves enter into the spaces between the holding-plates and seats, when the elasticity of the valves will cause them to assume their proper respective positions, as shown in the drawing. This is a very simple arrangement, but for high pressure I prefer to employ the arrangement shown in Figs. 1 and 2, because the screw *d* and movable plates *c* *c'* enable the elastic valves to be more firmly held and adjusted.

In Fig. 4 a single circular elastic valve, *a*, is held in position between a circular seat, $b^1$, and an adjustable holding-plate, *c*, so that the outer edge or lip of the elastic valve, instead of pressing against the corresponding lip of another elastic valve, as in the arrangements already described, is caused to press against a fixed seat or facing, forming a part of the lower side of the valve-chamber. In this case the holding-plate $c$ and seat or ledge $b^1$ are made flat, and the elastic valve is formed at its outer edge somewhat like a dish or an inverted plate; but it will be evident that flat elastic valves provided with seats $b^1$ and holding-plates $c$, made conical, as shown in Figs. 1, 2, and 3, or otherwise curved, may be arranged singly, with their lips bearing against a fixed seat or surface, as shown in Fig. 4. It will also be evident that the forms of the holding-plates and seats, and also the forms of the elastic valves may be more or less varied without departing from the distinctive character of my invention; but I would remark that I prefer to use flat valves, because they are the most simple, and will be cheaper to manufacture than the others.

The modification illustrated in Fig. 6 is composed of a series of rings and flat washers, as will be fully understood from the drawing, each pair of rings $b^3$ $b^4$ being connected together by the connecting pieces $b$, as shown. This arrangement allows of a large increase in the diameter of the suction or delivery opening C, without materially increasing the diameter of the elastic valves or washers.

I am aware that flat elastic valves have been used in such manner that the entire side or face of the valve rests upon or bears against a fixed perforated plate or seat, so that the entering fluid, on passing through the perforations in the said plate or seat, raises or moves the valves therefrom; but, by arranging the valves so that their outer circumferences or lips only press against the faces of each other or against the seat of the valve-chamber, according to my invention, they are enabled to withstand very great pressure, because such pressure tends to condense the material of which the valves are made by forcing them edgewise against their circular abutments. I also secure a free passage or way for the fluid, and the valves will accommodate themselves more readily to any irregularities in the surface against which they close.

I would have it understood that what I claim as new, and desire to have secured to me by Letters Patent, is—

1. A valve for pumps, consisting of a flexible ring or disk, $a$, retained in the position described, so that its outer edge shall have an annular bearing upon the seat, as set forth.

2. The combination of a holder, constructed substantially as described, and a series of annular lips of flexible material, arranged one above the other in pairs, each pair being in contact at their outer edges, as described.

In testimony whereof I have signed my name to this specification in the presence of two subscribing witnesses.

EDWARD FIELD.

Witnesses:
W. LLOYD WISE,
*Patent Agent, London.*
H. E. WILES, *London.*